US009832973B2

United States Patent
Pound et al.

(10) Patent No.: US 9,832,973 B2
(45) Date of Patent: Dec. 5, 2017

(54) AUTOMATICALLY-ATTACHING COLLAR CLASPS

(71) Applicant: The United States of America, as represented by the Secretary of Agriculture, Washington, DC (US)

(72) Inventors: Joe M. Pound, Ingram, TX (US); Kimberly H. Lohmeyer, Kerrville, TX (US); Gary R. Earl, Kerrville, TX (US); Randy W. Ryan, Jr., Harper, TX (US); Joseph E. Johnson, Jr., Perry, ME (US)

(73) Assignee: The United States of America, as represented by The Secretary of Agriculture, Washington, DC (US)

( * ) Notice: Subject to any disclaimer, the term of this patent is extended or adjusted under 35 U.S.C. 154(b) by 250 days.

(21) Appl. No.: 14/719,748

(22) Filed: May 22, 2015

(65) Prior Publication Data

US 2016/0338324 A1 Nov. 24, 2016

(51) Int. Cl.
*A01K 11/00* (2006.01)
*A01K 27/00* (2006.01)

(52) U.S. Cl.
CPC .......... *A01K 11/006* (2013.01); *A01K 27/001* (2013.01); *A01K 27/007* (2013.01)

(58) Field of Classification Search
CPC ..... A01M 23/00; A01M 23/34; A01K 27/007; A01K 27/001; A01K 11/00; A01K 29/00; A01K 5/02; A01K 11/006; A01K 13/003
USPC ..... 119/856–860, 863–865, 650–678; 43/58, 43/85–87; 40/300–304
See application file for complete search history.

(56) References Cited

U.S. PATENT DOCUMENTS

| | | | | |
|---|---|---|---|---|
| 859,181 A * | 7/1907 | Snearly | ................. | F04D 25/105 416/100 |
| 1,091,923 A * | 3/1914 | Frenier | ................. | A01M 23/34 43/87 |
| 2,481,800 A * | 9/1949 | Tyler | ..................... | A01M 23/24 43/85 |
| 2,956,542 A * | 10/1960 | Mueller | ................ | A01K 15/04 119/760 |
| 3,387,588 A * | 6/1968 | Bird | ..................... | A01K 15/006 119/760 |
| 4,287,644 A * | 9/1981 | Durand | ................. | F16L 3/2334 24/16 PB |
| 4,978,091 A * | 12/1990 | Anderson | .......... | B65D 63/1063 24/16 PB |
| 5,568,952 A * | 10/1996 | Ruegg | ................ | B65D 63/1081 292/307 A |

(Continued)

FOREIGN PATENT DOCUMENTS

| | | | | |
|---|---|---|---|---|
| DE | 19855560 A1 * | 6/2000 | ............ | A01K 11/00 |
| GB | 191400996 A * | 0/1914 | ............ | A01M 23/34 |

*Primary Examiner* — Lisa L Tsang
*Assistant Examiner* — Magdalena Topolski
(74) *Attorney, Agent, or Firm* — John D. Fado; Robert D. Jones

(57) ABSTRACT

The automatically attaching collar clasps are installed in an animal bait station. The bait station has an inlet so that when an animal is positioned in the inlet, a male clasp on one side of the inlet automatically converges with a female clasp on the opposite side to the inlet to create a ratcheting connection and thereby secures a collar around the neck of the targeted animal.

12 Claims, 5 Drawing Sheets

(56) References Cited

U.S. PATENT DOCUMENTS

| | | | | |
|---|---|---|---|---|
| 5,983,540 A * | 11/1999 | Ashley | ............... | A01K 11/00 40/300 |
| 6,079,141 A * | 6/2000 | Washecka | ............... | A01K 97/14 114/221 R |
| 6,467,436 B1 * | 10/2002 | Olausson | ............... | A01K 27/001 119/792 |
| 6,715,449 B1 * | 4/2004 | Jordan | ............... | A01K 27/005 119/863 |
| 7,918,050 B2 * | 4/2011 | Sturgeon | ............... | A01M 23/34 43/85 |
| 2008/0168952 A1 * | 7/2008 | Morehead | ............... | A01K 27/006 119/859 |
| 2008/0245315 A1 * | 10/2008 | Tyler | ............... | A01K 27/007 119/654 |
| 2010/0101503 A1 * | 4/2010 | Epling | ............... | A01K 1/0017 119/512 |
| 2011/0138676 A1 * | 6/2011 | Moustirats | ............... | A01M 23/20 43/61 |
| 2013/0192538 A1 * | 8/2013 | Ulrich | ............... | A01K 1/0613 119/740 |
| 2015/0150235 A1 * | 6/2015 | Chang | ............... | A01M 23/34 43/87 |

* cited by examiner

AUTOMATICALLY-ATTACHING COLLAR CLASPS

FIELD OF THE INVENTION

The disclosed method and apparatus relates to attachment clasps used in an automated collaring system. Specifically, as an animal feeds at a specially-designed bait station, two mechanical arms (that are built into the bait station) converge around the animal's neck and join a male collar clasp to a corresponding female collar clasp and thereby secure a collar around the animal's neck.

BACKGROUND OF THE INVENTION

Many diseases are transmissible to man and animals by ectoparasites such as ticks. Because some wildlife species (for example white-tailed deer) are capable of propagating and harboring large populations of these ectoparasites, an effective strategy for the prevention of disease transmission should include the treatment of the wildlife that inhabit a treatment area.

In targeted tick eradication areas, the ability to control ticks on wildlife can be a critical factor to the success of an eradication program. For example, cattle ticks were eradicated from the United States in the 1950's, and a quarantine Zone was established along the Texas-Mexico border between Del Rio and Brownsville, Tex. to prevent re-infestation of US cattle herds. Yearly outbreaks of ticks that occur in the quarantine zone are controlled by treating the cattle and by vacating infested pastures. However, the cattle frequently intermingle with grazing (for example) deer so that the cattle are frequently re-infected by the ticks infecting the deer. Any successful cattle tick eradication program must also address the ticks that infect the deer.

Unfortunately, the treatment of significant numbers of wild animals presents multiple challenges. The conventional method for treating wild animals generally comprises tranquilizing the animals, treating the animals, and then releasing the treated animal. However, this process is labor intensive, slow, and dangerous for both the animals and their handlers.

One alternative means of addressing the tick problem is the application of a pesticide-impregnated collar. The current inventors previously patented a device for automatically applying collars (U.S. Pat. No. 5,881,672 to Pound et al., hereinafter "Pound '672"), which is hereby incorporated by reference. However, the apparatus was originally designed to apply hook-and-loop type collars. While these collars are easy to apply, the collars can be dislodged by the heavy underbrush that is a part of the deer's natural habitat.

The need exists for a collar clasp that can be applied using the existing automated collaring equipment (with only minor modifications) wherein the collar connection is more durable and secure than the current hook-and-loop-type collar connection. The current invention comprises a collar clasp that includes a ratcheting "cable-tie" type mechanism that is equally as easy to apply and much more durable and secure than the current collar connection means.

SUMMARY OF THE INVENTION

This disclosure is directed to an automatically-attaching collar system for a target animal (preferably a deer). The system includes a flexible collar. A male clasp is attached to one end of the collar and a female clasp is attached to the opposite end of the collar. The male clasp includes a harpoon and the female clasp includes a corresponding receiving aperture. The male clasp is positioned on one side of a bait station inlet, and the female clasp being positioned on the other side of the inlet. When a target animal enters the bait station inlet, the male clasp and the female clasps converge so that the harpoon extends into the receiving aperture so that the collar is joined around the target animal's neck.

DETAILED DESCRIPTION OF PREFERRED EMBODIMENTS

Figure 1:
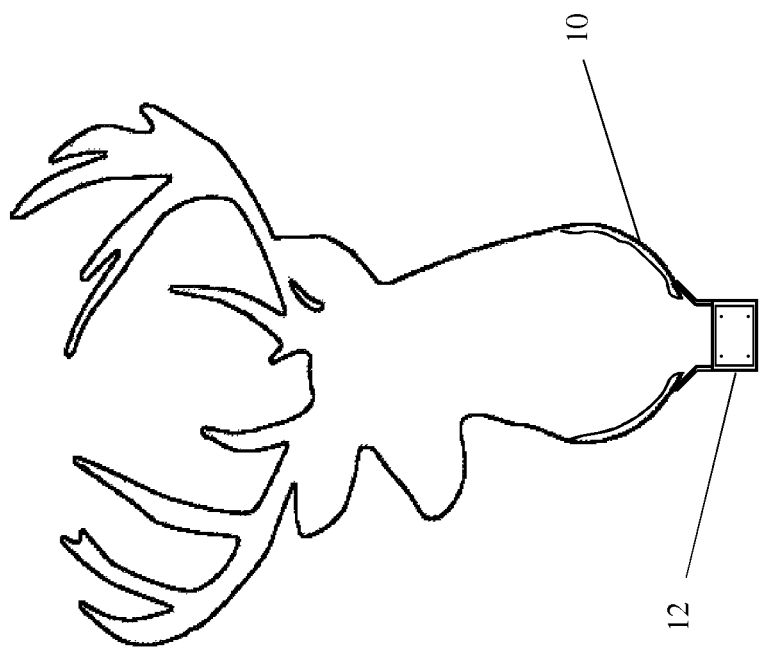
FIG. 1 is a perspective view of the collar and a pendant assembly as described herein—as the collar would be worn by a deer.

As generally shown in FIG. 1, current invention is directed to a collar 10 that is intended to be worn around the neck of an animal. In the preferred embodiment, the animal is a deer and the collar 10 comprises a pesticide-impregnated collar. FIG. 1 shows the collar 10 with an automatically-detachable collar pendant system 12 that may be used to automatically release the collar so that the collar falls off the deer's neck. The collar pendant system 12 is the subject of a co-pending patent application.

As briefly described above, the current invention is intended to be used with an existing automatic collaring bait station 14, such as the bait station described in the Pound '672 patent. In accordance with Pound '672, feed is placed in a strategically positioned feed bin 16 (see FIG. 2) so that when an animal enters the inlet 18 and extends its neck to eat the feed in the bin 16, the animal's position is detected by at least one of multiple sensors 20.

In the preferred embodiment, the sensors 20 are deployed around the inlet 18 and in the feed bin 16 to ensure that the animal is the correct position to apply a collar 10. The bait station 14 further comprises a radio frequency identification (hereinafter "RFID") detecting antenna/device 72 and associated hardware required to read an RFID tag. An RFID tag may be attached to the collar 12 or injected under the animal's skin. The RFID detection and translation ensures that the automatic collaring bait station does not try to collar already-collared animals.

Figure 2:
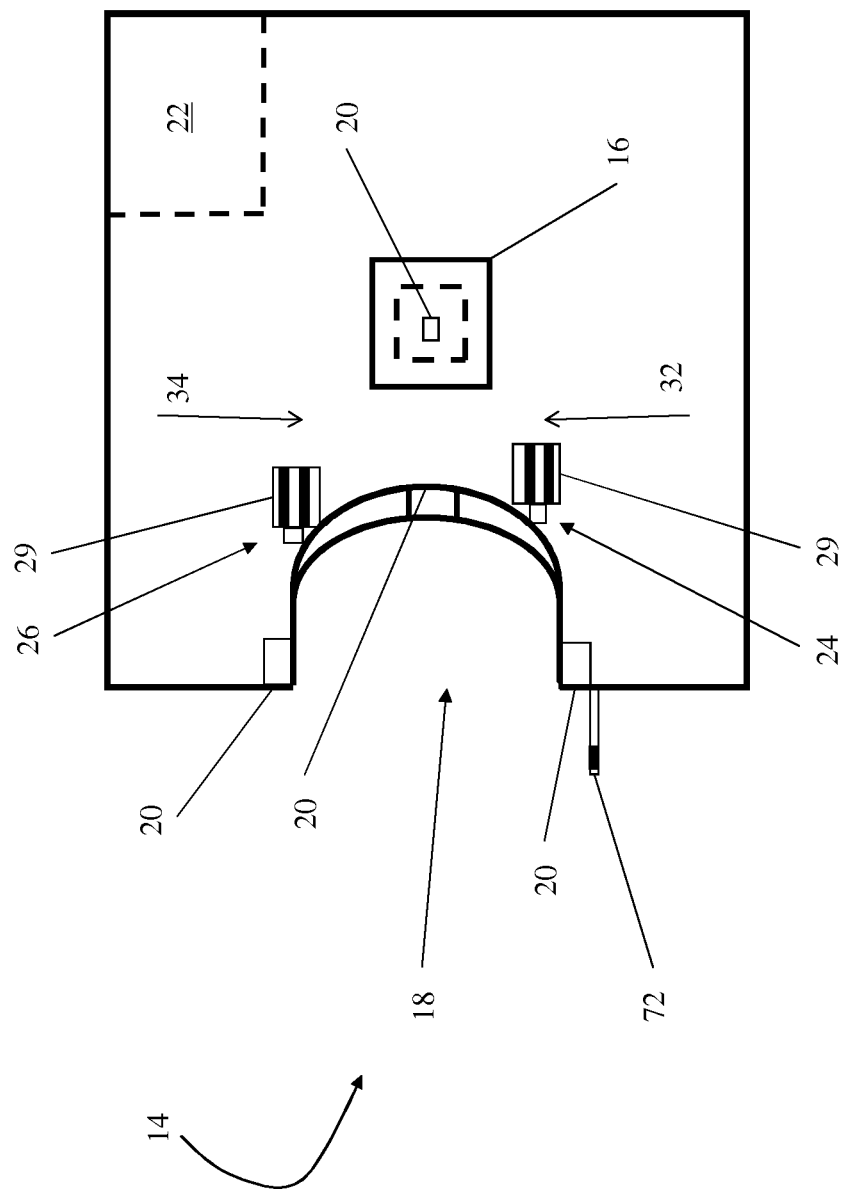
FIG. 2 is a top view of a bait station adapted to apply the collar and clasps.

The sensors 20 send a signal to a controller 22, which "wakes up", and activates a pair of mechanical arms 24, 26 that are mounted adjacent to the inlet 18. Each mechanical arm 24, 26 includes at least one pin 29 (preferably each mechanical arm 24, 26 includes at least two pins 29, as shown in FIG. 2). The pins 29 are positioned to snap into corresponding fittings 71 on the male 40 and female 60 clasps (described in greater detail below). The automatic collaring bait station 14 is configured so that one of the mechanical arms 24 holds the male clasp 40, and the opposing arm 26 holds the female clasp 60. The structure immediately adjacent to the pins 29 and the clasps 40, 60 may include metal inserts which interact with the corresponding magnets in the collaring arms to help hold the collar clasps 40, 60 on the pins 29 and thereby prevent the clasps 40, 60 from being dislodged (for example, by the animal's antlers) before the mechanical arms 24, 26 are activated and during collaring. When the controller 22 sends the appropriate signal, the mechanical arms 24, 26 converge around the neck of the deer in the direction of the arrows 32, 34 and join the clasps 40, 60 together so that the collar 10 is secure around the deer's neck.

Figure 3:
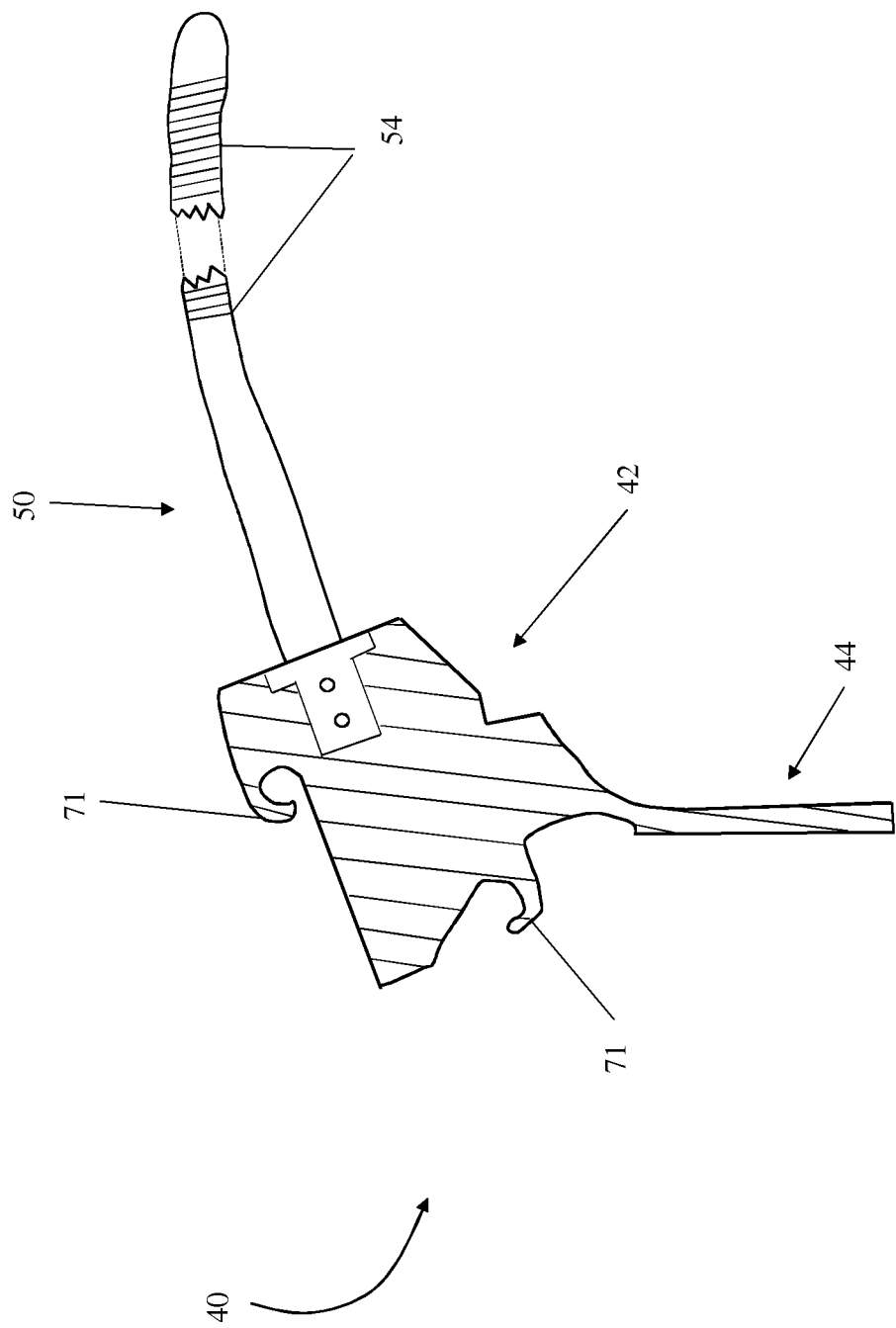
FIG. 3 is a sectional view of the male clasp.
Figure 4:
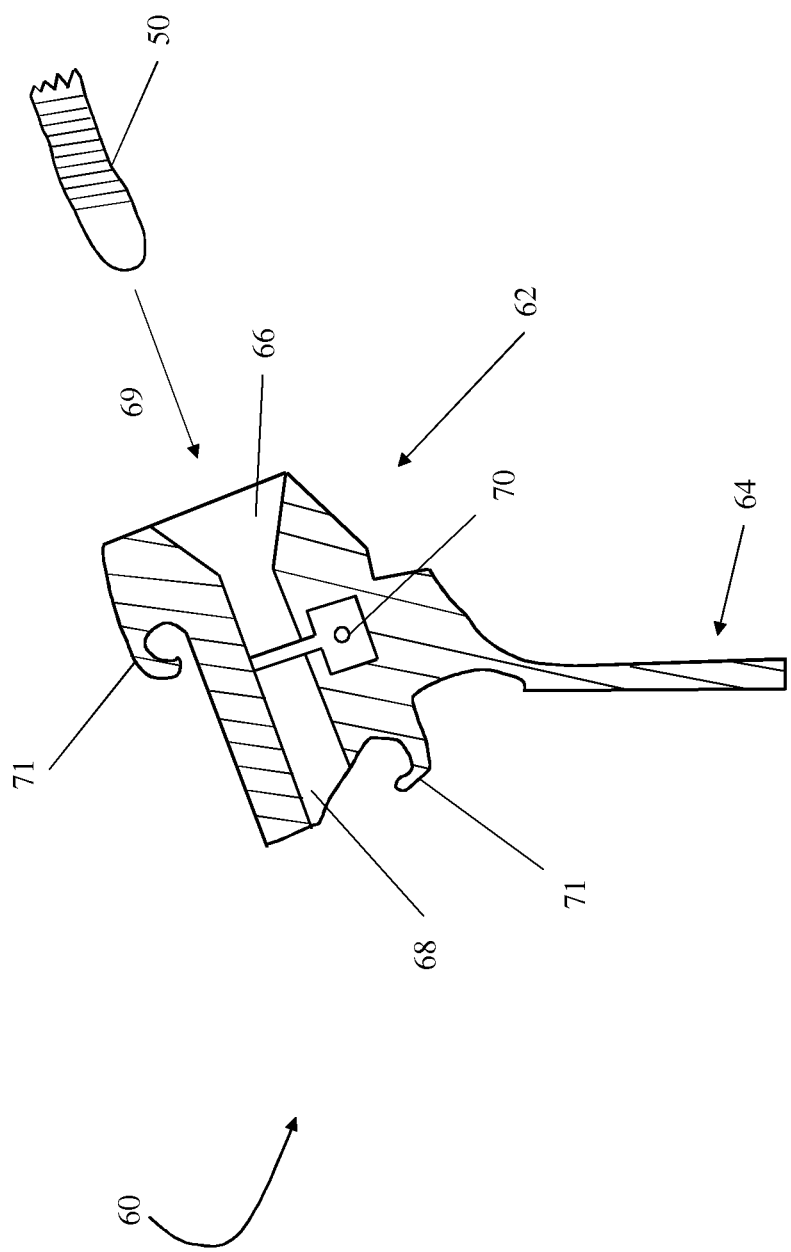
FIG. 4 is a sectional view of the female clasp.

With regard to the structure of the respective clasps 40, 60, a cross-sectional view of the male clasp 40 is shown in FIG. 3, and a cross-sectional view of the female clasp 60 is shown FIG. 4. The collars may be molded or otherwise fabricated in one or more pieces then snapped, glued or fastened together as appropriate.

As shown in FIG. 3, the male collar clasp 40 comprises an upper body 42 and a lower body 44. The lower body 44 is designed to be riveted or otherwise attached to one end of the collar 12. The upper body 42 comprises an elongated fastening projection 50. In the preferred embodiment, the elongated fastening projection comprises a "harpoon" joining/fastening mechanism 50. For the purposes of this disclosure, a "harpoon" 50 is defined as an elongated semi-rigid projection with multiple rows of "teeth" 54. The harpoon teeth 54 are angled so that, when the teeth 54 are engaged with a corresponding pawl 70 (see FIG. 4), a ratcheting connection is created—such as the connection commonly created by conventional "cable ties" or "tie-wraps". A harpoon 50 essentially comprises the same structures found in the "rack" portion of conventional cable ties. In alternative embodiments, other types of elongated fastening projections (for example a "toggle-bolt" type anchor/connection, a friction fit connection, or the like) should be considered within the scope to the claims.

As shown in FIG. 4, the female clasp 60 also comprises an upper body 62 and a lower body 64. The lower body 64 is designed to be riveted or otherwise attached to one end of the collar 12. The upper body 62 comprises a conical receiving aperture 66 designed to direct the end portion of the harpoon 50 into a harpoon retention channel 68 in the direction of the arrow 69. As the harpoon 50 enters the harpoon retention channel 68, the harpoon teeth 54 engage a (preferably) metal pawl 70. The pawl 70 essentially comprises the same structure found in the "ratchet" portion of conventional cable ties. Once the teeth 54 of the harpoon 50 engage the pawl 70 of the female clasp 60, a secure ratcheting connection is created so that the harpoon 50 cannot be extracted from the retention channel 68 without applying a substantial amount of force and significantly damaging the female clasp 60 and/or the harpoon 50.

Figure 5:
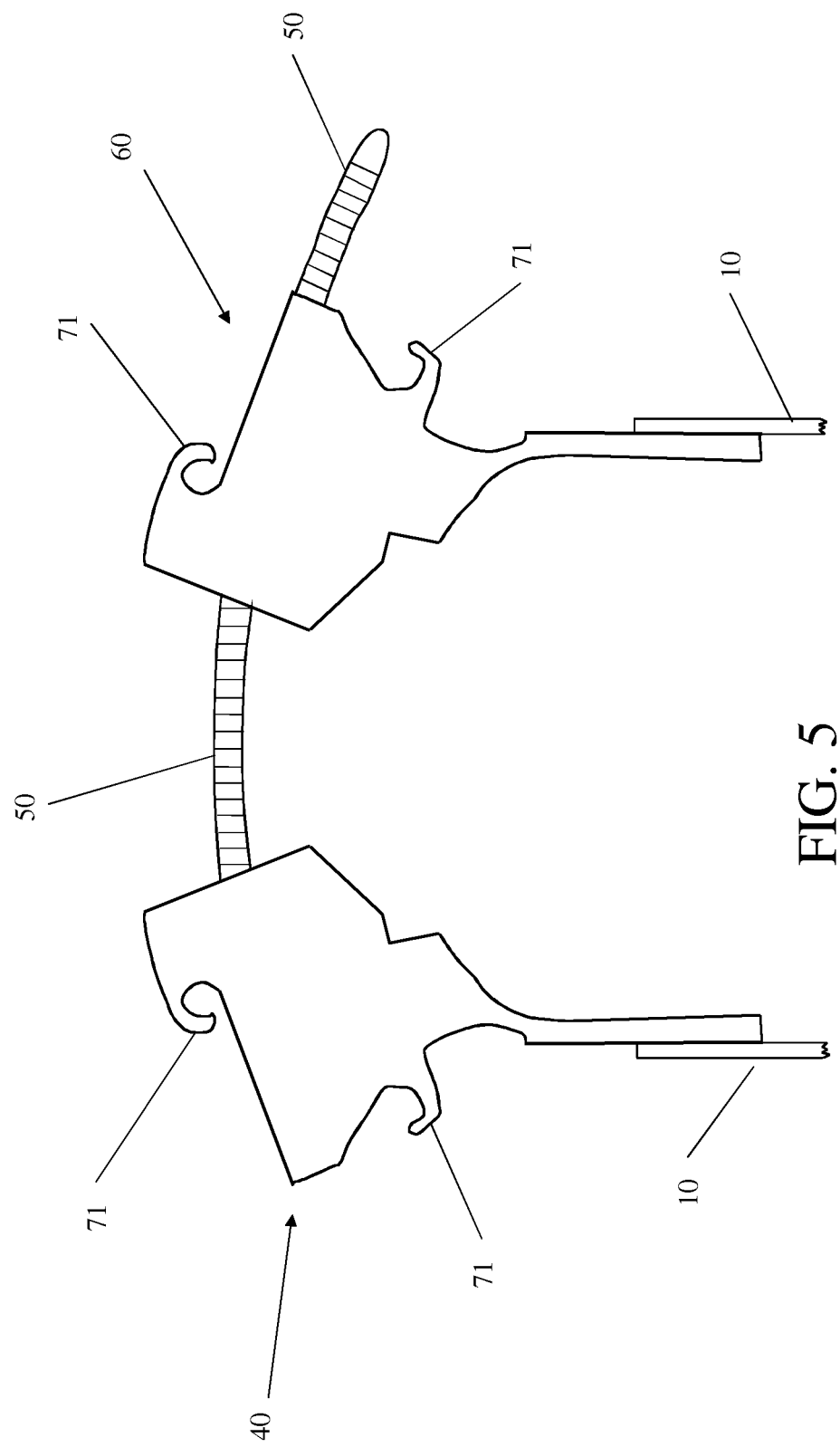
FIG. 5 is a front view of the connected male and female clasps.

FIG. 5 shows the male clasp 40 securely joined to the female clasp 60 and also joined to the pesticide-impregnated collar 10.

As shown in FIGS. 3-5, both the male 40 and 60 female connectors include at least one "breakaway" fitting 71. The breakaway fittings 71 are designed to engage the pins 29 on each of the mechanical arms 24, 26 (see FIG. 2). When the mechanical arms 24, 26 converge and the harpoon 50 of the male clasp 40 locks with the pawl 70 of the female clasp 60, the deer (or other target animal) pulls away from the bait station 14 so that the pins 29 pop out of the breakaway fittings 71 while the collar 10 remains in position around the deer's neck.

In operation, as shown in FIG. 2, deer attracted to a bait station 14 must enter an inlet 18 to access food in a food bin 16. When the deer stretches its neck out to feed, a sensor 20 detects the deer's presence and a controller 22 directs two mechanical arms 24, 26 to converge in the direction of the arrows 32, 34 around the deer's neck. A male clasp 40 is loaded on one of the arms 24, and a female clasp 60 is loaded on the opposite arm 26. Pins 29 in each of the mechanical arms 24, 26 join with the breakaway fittings 71 on each corresponding clasp 40, 60 to hold the clasps 40, 60 in place on the mechanical arms 24, 26.

As the arms 24, 26 converge, the harpoon 50 of the male clasp 40 is directed into the conical receiving aperture 66 of the female clasp 60 so that the harpoon teeth 54 engage with the pawl 70 of the female clasp 60. FIG. 5 shows the clasps 40, 60 in the engaged position. Once the clasps 40, 60 are engaged, the arms 24, 26 begin to retract and the deer backs away from the bait station—thereby causing the pins 29 to pop out of the breakaway fittings 71 so that the deer separates from the bait station 14 with the collar 10 secured around the deer's neck.

For the foregoing reasons, it is clear that the method and clasps described herein comprise an innovative collar attachment system. The current system may be modified in multiple ways and applied in various technological applications. The disclosed method and apparatus may be modified and customized as required by a specific operation or application, and the individual components may be modified and defined, as required, to achieve the desired result.

Although the materials of construction are only generally described, they may include a variety of alternate compositions consistent with the function described herein. Such variations are not to be regarded as a departure from the spirit and scope of this disclosure, and all such modifications as would be obvious to one skilled in the art are intended to be included within the scope of the following claims.

What is claimed is:

1. An automatically-attaching collar system for a target animal, the system comprising:
    a flexible collar having first and second ends;
    a male clasp comprising an elongated projection, the male clasp being connected to the first end of the collar, the male clasp being attached to a first mechanical arm;
    a female clasp comprising a receiving aperture, the female clasp being connected to the second end of the flexible collar, the female clasp being attached to a second mechanical arm; and,
    a bait station inlet, the male clasp being positioned on one side of the inlet, and the female clasp being positioned on an opposite side of the inlet;
    at least one sensor positioned in the inlet, the at least one sensor detecting a position of the target animal in the inlet;
    a controller in electronic communication with the at least one sensor as well as the first and the second mechanical arms; and
    an RFID-detecting device in communication with the controller;
    wherein, as the target animal enters the inlet, the at least one sensor detects the target animal and the controller activates the first and the second mechanical arms so that the male clasp and the female clasps converge and the elongated projection of the male clasp enters the receiving aperture, thereby fastening the collar around the target animal's neck, wherein the collar comprises an RFID tag.

2. The system of claim 1 wherein the elongated projection comprises a harpoon.

3. The system of claim 2 wherein the female clasp comprises a pawl that connects with the harpoon to create a ratcheting connection.

4. The system of claim 3 wherein the pawl is comprised of metal and is positioned inside a retention channel in the female clasp.

5. The system of claim 1 wherein the collar comprises a pesticide-saturated plastic collar.

6. The system of claim 1 wherein the elongated projection has a semi-rigid structure.

7. The system of claim 1 wherein the receiving aperture has a conical shape so that the elongated projection is directed into a retention channel within the female clasp.

8. The system of claim 1 wherein both the male and the female clasps each include at least one breakaway fitting, so that the at least one breakaway fitting on the male clasp is attached to a pin on the first mechanical arm, and the at least one breakaway fitting on the female clasp is attached to a pin on the second mechanical arm.

9. The system of claim 8 wherein the male and the female clasps each include a metal insert that interacts with at least one corresponding magnet in each of the first and the second mechanical arms to hold the male and the female clasps, thereby preventing the male and the female clasps from being dislodged before the first and second mechanical arms are activated and during collaring.

10. The system of claim 8 wherein the system is structured so that once the collar is in place around the target animal's neck, the at least one breakaway fitting on the male clasp and the at least one breakaway fitting on the female clasp are configured to pop out of the first and the second mechanical arms.

11. The system of claim 1 wherein the system is structured so that at least three sensors are positioned in the bait station inlet to detect the position of the target animal, and one sensor is positioned in a feed bin adjacent to the bait station inlet so that the sensor detects a position of the target animal's head relative to the bait station inlet.

12. An automatically-attaching collar system for a target animal, the system being structured so that when the target animal enters a bait station inlet and is detected by a sensor in the bait station inlet, a controller in communication with the sensor causes a male collar clasp on a first mechanical arm and a female collar clasp on a second mechanical arm to converge to attach a collar around the target animal's neck, wherein both the male and the female clasps each include at least one breakaway fitting, so that the at least one breakaway fitting on the male clasp is attached to a pin on the first mechanical arm, and the at least one breakaway fitting on the female clasp is attached to a pin on the second mechanical arm.

* * * * *